United States Patent
Mathews et al.

(10) Patent No.: US 12,470,575 B2
(45) Date of Patent: Nov. 11, 2025

(54) WEBSITE REPUTATION CACHE BASED ON CONNECTED DEVICE FEATURES

(71) Applicant: Cujo LLC, Walnut, CA (US)

(72) Inventors: James Mathews, Utrecht (NL); Santeri Kangas, Kirkkonummi (FI)

(73) Assignee: Cujo LLC, Covina, CA (US)

( * ) Notice: Subject to any disclaimer, the term of this patent is extended or adjusted under 35 U.S.C. 154(b) by 187 days.

(21) Appl. No.: 18/073,264

(22) Filed: Dec. 1, 2022

(65) Prior Publication Data

US 2024/0187433 A1 Jun. 6, 2024

(51) Int. Cl.
*H04L 29/06* (2006.01)
*G06F 16/957* (2019.01)
*H04L 9/40* (2022.01)

(52) U.S. Cl.
CPC ...... *H04L 63/1425* (2013.01); *G06F 16/9574* (2019.01); *H04L 63/1416* (2013.01)

(58) Field of Classification Search
CPC ............. G06F 16/9574; H04L 63/1416; H04L 63/1425
See application file for complete search history.

(56) References Cited

U.S. PATENT DOCUMENTS

| | | | |
|---|---|---|---|
| 9,838,419 B1 * | 12/2017 | Fleyder | H04L 63/101 |
| 11,165,797 B2 * | 11/2021 | Ackerman | H04L 63/1458 |
| 2016/0173510 A1 * | 6/2016 | Harris | H04L 63/20 726/23 |
| 2017/0279831 A1 * | 9/2017 | Di Pietro | H04L 43/0894 |
| 2019/0044950 A1 | 2/2019 | Chen et al. | |

FOREIGN PATENT DOCUMENTS

CN 113987501 A 1/2022

OTHER PUBLICATIONS

Extended European Search Report for European Patent Application No. 22210911.8, mailed May 25, 2023, 7 pages.

* cited by examiner

*Primary Examiner* — Tri M Tran
(74) *Attorney, Agent, or Firm* — Dority & Manning, P.A.

(57) ABSTRACT

One or more features of a connected device are determined. A set of websites potentially accessed by the connected device are defined based on the one or more features. Reputation data for the set of websites is determined. The reputation data for the set of websites is stored into a cache. Network traffic between the connected device and an accessed website is intercepted. Reputation data for the accessed website is retrieved from the cache based on the network traffic. A cybersecurity operation related to the connected device is performed based on the reputation data for the accessed website.

15 Claims, 7 Drawing Sheets

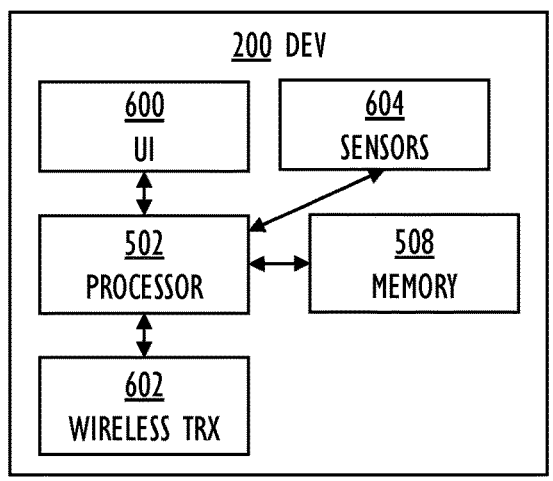
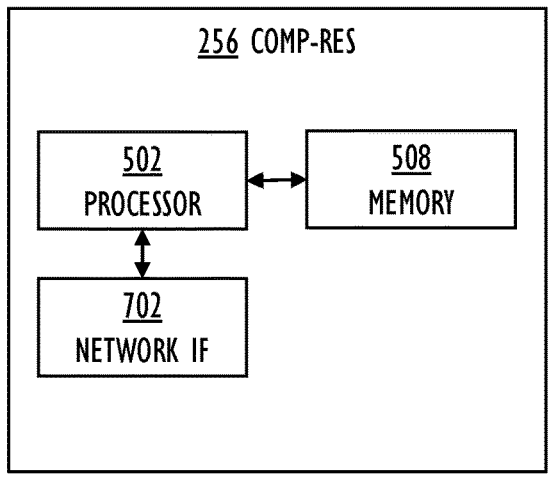
FIG. 6
FIG. 7
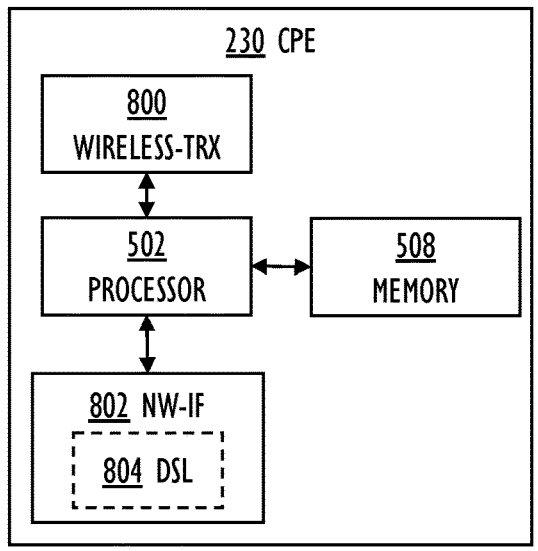
FIG. 8A
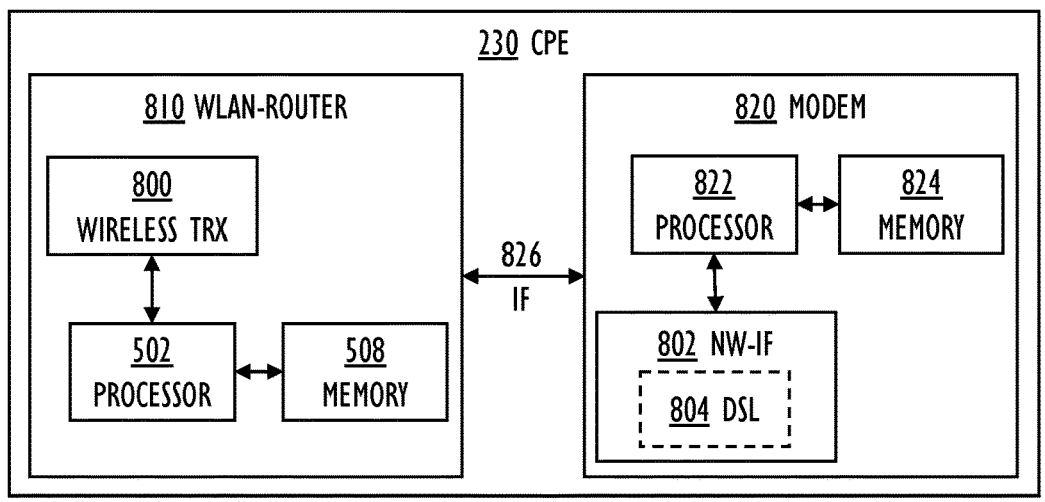
FIG. 8B

WEBSITE REPUTATION CACHE BASED ON CONNECTED DEVICE FEATURES

BACKGROUND

Users of connected devices such as smartphones and laptops are increasingly confronted with cybercrime. Cybersecurity protects connected devices from theft, damage and disruption, for example. Complicated procedures and checks are required for the cybersecurity operations causing extra delay for data communication and processing, which needs to be mitigated.

SUMMARY

According to an aspect of the disclosure, there is provided subject matter of independent claims.

One or more examples of implementations are set forth in more detail in the accompanying drawings and the detailed description.

BRIEF DESCRIPTION OF DRAWINGS

Some examples will now be described with reference to the accompanying drawings, in which

FIG. 6 is a block diagram illustrating an example of a connected device;

FIG. 7 is a block diagram illustrating an example of a computing resource; and

FIG. 8A and FIG. 8B are block diagrams illustrating examples of a customer-premises equipment.

DETAILED DESCRIPTION

Figure 1A:
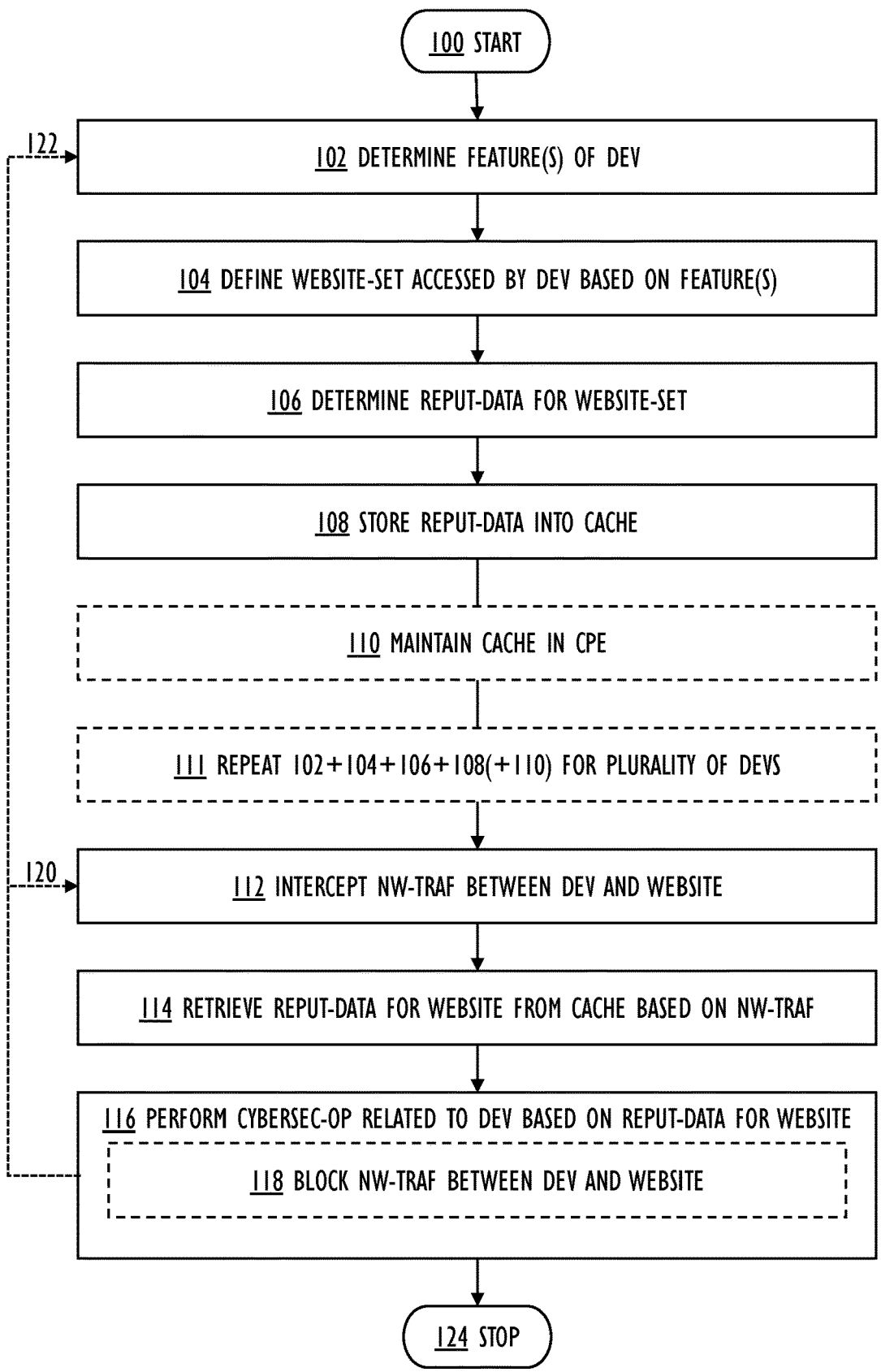
FIG. 1A and FIG. 1B are flowcharts illustrating examples of a method.

The following description discloses examples. Although the specification may refer to "an" example in several locations, this does not necessarily mean that each such reference is to the same example(s), or that the feature only applies to a single example. Single features of different examples may also be combined to provide other examples. Words "comprising" and "including" should be understood as not limiting the described examples to consist of only those features that have been mentioned as such examples may contain also features and structures that have not been specifically mentioned. The examples and features, if any, disclosed in the following description that do not fall under the scope of the independent claims should be interpreted as examples useful for understanding various examples and implementations of the invention.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

One important cybersecurity operation is a determination of a reputation of a website. The reputation may be defined with four categories, for example: malicious, trustworthy, suspicious, or unknown. If the reputation of the website is malicious, an appropriate cybersecurity operation may be to block an access from a connected device to the website. But if the reputation of the website is trustworthy, no cybersecurity operation is needed, and a network traffic from the connected device to the website is allowed. The reputation of the website may also be suspicious, which may necessitate an appropriate cybersecurity operation such as indicating the suspicious reputation of the website to the user of the connected device, and inquiring from the user whether the access to the suspicious website should continue. If the reputation of the website is unknown, the warning and user inquiry may be used, but in addition to this, the cybersecurity system triggers an analysis for determining the reputation for this previously unknown website.

As complicated procedures and checks are required for the cybersecurity operations and reputation maintenance, delays in data communication and processing may increase. If the connected device is a user device, the user experience for the user of the connected device may deteriorate.

Figure 1B:
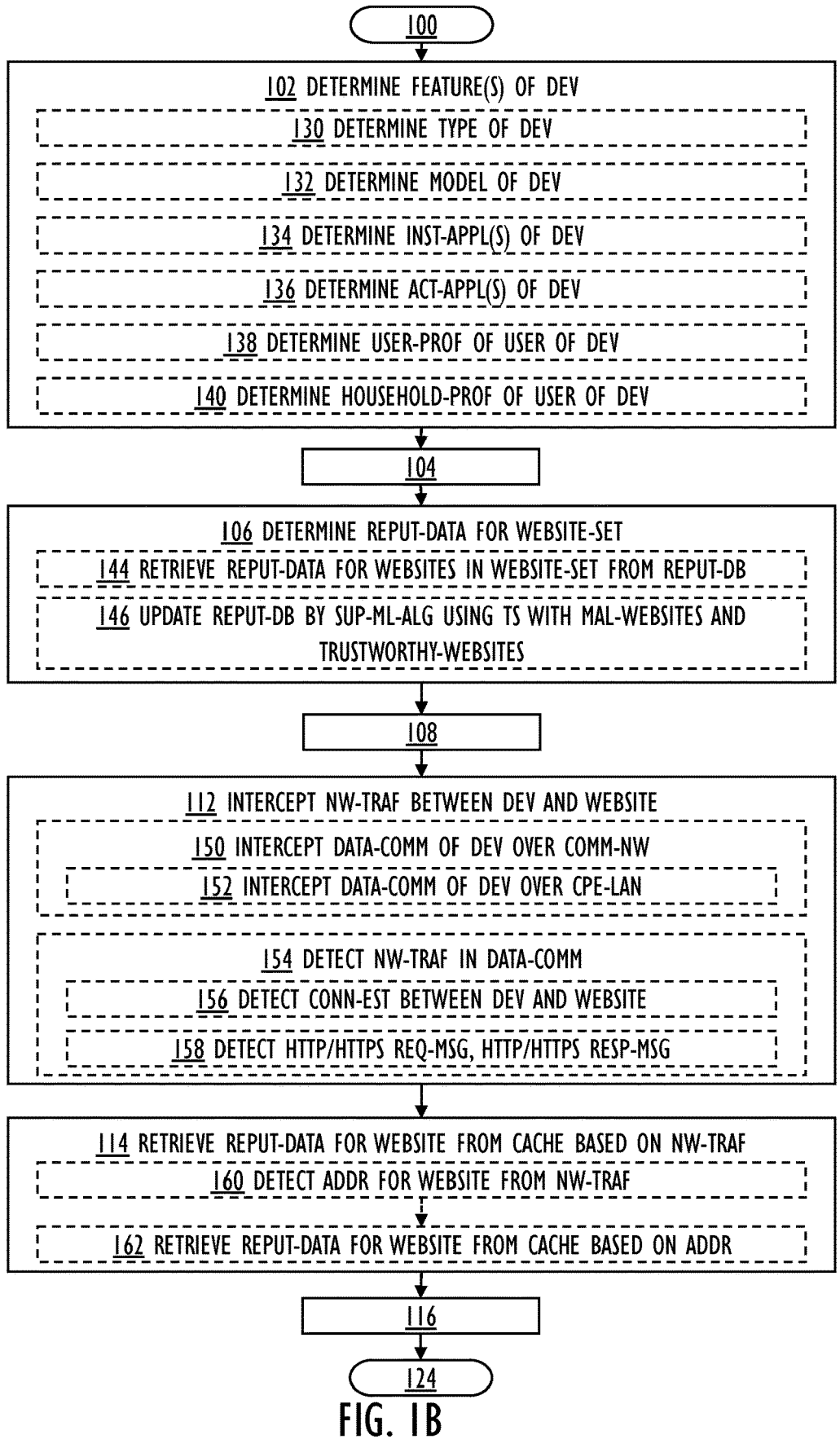

FIG. 1A and FIG. 1B illustrate a method. The method performs cybersecurity operations related to the reputation in an improved manner.

The method starts in 100 and ends in 124. The method may run in principle endlessly. The infinite running may be achieved by looping 120 back from an operation 116 to an operation 112, or periodically (or by a system request) looping 122 back from the operation 116 to an operation 102, for example.

The operations are not strictly in chronological order in FIG. 1A and FIG. 1B, i.e., no special order of operations is required, except where necessary due to the logical requirements for the processing order. In such a case, the synchronization between operations may either be explicitly indicated, or it may be understood implicitly by the skilled person. If no specific synchronization is required, some of the operations may be performed simultaneously or in an order differing from the illustrated order. Other operations may also be executed between the described operations or within the described operations, and other data besides the illustrated data may be exchanged between the operations.

Figure 2:
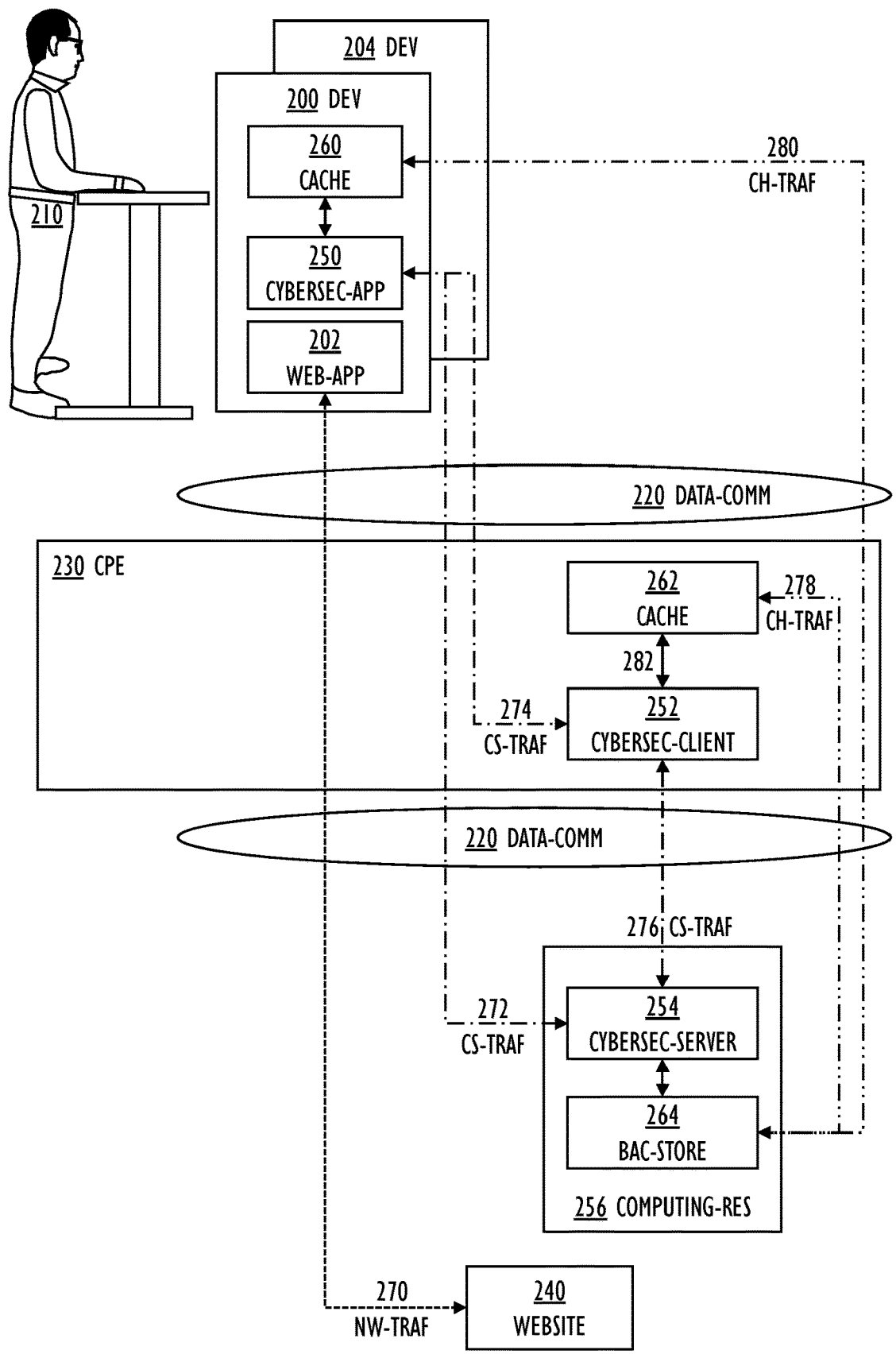
FIG. 2 is a block diagram illustrating an example implementation environment for the method.

FIG. 2 illustrates an example implementation environment for the method. The method may be a computer-implemented method.

The method may be divided into two parts. In the first part, reputation data is gathered into a cache 260, 262, and in the second part, the cache 260, 262 is used for performing cybersecurity operations for a connected device 200 of a user 210.

As used herein, the term "connected device" 200 refers to a physical device with communication capabilities configured to communicate via the internet. The connected device 200 includes, but is not limited to, a user device, an Internet of Things (IOT) device, or another ubiquitous computing device.

The user device may be a terminal, a mobile device, a user equipment (UE), a radio terminal, a subscriber terminal, a smartphone, a mobile station, a mobile phone, a desktop computer, a portable computer, a laptop computer, a tablet computer, a smartwatch, smartglasses, a game terminal, or some other type of a wired or wireless mobile or stationary user communication device operating with or without a subscriber identification module (SIM) or an embedded SIM (eSIM).

The IoT device is provided with processing and communication technology and may also include one or more sensors and a user interface, and may be a stand-alone device, or an embedded device in a lighting fixture, thermostat, home security system, camera, smart lock, smart doorbell, smart refrigerator, or another household appliance, heating and cooling system, home and building automation system, vehicle, health and fitness monitor, remote health monitoring system, environmental sensor, IP camera, or network attached storage (NAS), etc.

First, one or more features of the connected device 200 are determined 102. The feature of the connected device 200 may be determined 102 in a variety of different ways.

In general, the one or more features may be determined either based on characteristics of the connected device 200, or based on characteristics of the user 210 of the connected device 200.

The one or more features may be determined 130 as a type of the connected device 200.

The one or more features may be determined 132 as a model of the connected device 200.

The one or more features may be determined 134 as one or more installed applications in the connected device 200.

The one or more features may be determined 136 as one or more active applications in the connected device 200.

The one or more features may be determined 138 as a user profile of the user 210 of the connected device 200.

The one or more features may be determined 140 as a household profile of the user 210 of the connected device 200.

Next, a set of websites potentially accessed by the connected device 200 are defined 104 based on the one or more features. This may be implemented so that the one or more features directly define the characteristics of the connected device 200, and/or the one or more features define indirectly the characteristics of the connected device 200 through characteristics of the user 210 of the connected device 200. The one or more features may indicate technical features or limitations of the connected device 200. For example, if the user device 200 is a smartphone, tablet computer or a laptop provided with iOS mobile operating system, the websites potentially accessed by the connected device 200 may include websites providing software downloads for iOS, but not websites providing software download for the competing mobile operating systems such as Android. The mobile operating system may be determined based on the model of the connected device 200. In this way, the set of websites that may potentially accessed by the connected device 200 are predicted as a result of knowledge and experience. The knowledge and/or experience is based on the one or more features of the connected device 200. For example, the knowledge may be that that specific applications are active in the connected device 200, and the experience (as observed from numerous connected devices 200) may show that the user of the specific applications, or application combinations, is likely to access specific websites. Let us suppose that the connected device 200 is actively executing certain game applications, whereby the set of websites may contain numerous websites related to gaming.

The type of the connected device 200 may define that the connected device is a smartwatch, smartphone, tablet computer, laptop, or an IoT device, which again may indicate websites that may potentially be accessed or not. For example, if the type of the connected device 200 is a smartwatch, it may be unlikely that a website with a streaming video service is accessed. Or the IoT device may not include a touch screen but only one or more light-emitting diodes (LEDs), whereby numerous websites offering contents for the human user do not belong to the websites potentially accessed, but only a very limited number of websites are included in the websites potentially accessed, such as a website processing data collected by possible sensors on the IoT device, and a website providing software updates for the IoT device.

Installed applications (such as mobile apps) on the connected device 200 may also indicate the potentially accessed websites. Consider, for example, a laptop containing software for a video streaming application, whereby all known trustworthy video streaming websites may be added to the set of websites potentially accessed. Or consider a connected device 200, which is provided with one or more installed applications for online shopping, whereby the set of potentially accessed websites may include a suitable collection of online shopping 30 websites. The set of online shopping websites potentially accessed may be limited by a user profile of the user 210. The user profile of the user 210 may include various demographic features of the user 210, including, but not being limited to, age, sex, place of residence, nationality, mother tongue, usual foreign languages learned at school, etc. The user profile of the user 210 may also define various 35 interest groups for the user, including, but not being limited to, a tech geek, a tech novice, a literature buff, a movie enthusiast, an automotive enthusiast, classical music fan, a housewife, a teenage girl, a teenage boy, a professional, etc.

Alternatively, or in addition to installed applications, active applications, i.e., use frequency of certain applications may be quite revealing, and indicate the potentially accessed websites. Consider a user 210 that has installed numerous music streaming applications on his connected device 200, but actively only uses a certain music streaming application dedicated to classical music. From this fact it may be deduced that the user 210 is not likely interested in websites dealing with rock music, but may well be interested in various websites dealing with classical music, and maybe even arts and culture in general.

The household profile of the user 210 may also indicate websites that may be included in the set of websites potentially accessed. Another patent of the applicant, U.S. Pat. No. 11,411,842 B1, incorporated herein by reference in its entirety for all jurisdictions where applicable, describes a household cluster. The household profile, in the same way as the user profile, may indicate that the user 210 belongs to a certain kind of a user group, based on demographics, income, neighborhood, social class, etc. and consequently may indicate interests of the user 210, and therefore the potentially accessed websites.

Then, reputation data for the set of websites is determined 106. The reputation data for the websites in the set of websites may be retrieved 144 from a website reputation database. The website reputation database may be the backing store 264, but it may also be a common backend database maintained by the cybersecurity server application 254. The website reputation database may be updated 146 continuously by a supervised machine learning algorithm using a training set comprising malicious websites and trustworthy websites.

Finally, the reputation data for the set of websites is stored into the cache 260, 262.

As used herein, the term "cache" 260, 262 refers to a software component configured to store the reputation data so that future retrieval of the reputation data may be served faster. The reputation data stored in the cache 260, 262 may be a result of an earlier local check of the website reputation, or a copy of the reputation data stored on a backing store 262, such as a remote database 264 managed by a cybersecurity server application 254. The cache 260, 262 may be considered a predictive cache 260, 262 as explained earlier.

In other words, the cache 260, 262 is a high-speed data storage layer configured to store a subset of the reputation data so that future requests for the reputation data by the connected device 200 are served up faster than is possible by accessing the backing store 262 configured to primarily store the reputation data. In a distributed computing environment, a dedicated caching layer may be used to enable the system components, such as a cybersecurity application 250, a cybersecurity client 252, and a cybersecurity server application 254 to run independently from the cache 260, 262 with their own lifecycles without the risk of affecting the cache 260, 262. In this way, the cache 260, 262 may serve as a layer accessed by the system components, which is useful in a scenario where the system components are dynamically scalable. In a distributed caching environment, the reputation data may span multiple backing stores 262 and may be distributed as needed to local caches 260, 262 for use by connected devices 260, 404. Various caches 260, 262 and the backing store 264 may communicate 278, 280 as needed to maintain the reputation data.

The cache 260, 262 stores the reputation data for the set of websites. Each entry of the cache 260, 262 has a tag (=identity) of a specific website and a specific reputation data for that specific website. The tag specifies the identity of the data so that it may be stored in the backing store 264, and a copy of the data may be fetched from the backing store 264 to the cache 260, 262.

In this way, the cache 260, 262 trades off capacity for speed: the cache 260, 262 stores a subset of the complete reputation data as it stores the reputation data for the set of websites, whereas the backing store 264 is configured to store the complete reputation data (for all possible websites).

Retrieving the reputation data for the accessed website from the cache 260, 262 may result in two different events: a cache hit, or a cache miss.

A cache hit is the result of finding the reputation data for the accessed website from the cache 260, 262. A cache miss is the result of not finding the reputation data for the accessed website from the cache 260, 262. The cache hit results in reading the reputation data from the cache 260, 262, which is a faster operation than retrieving the reputation data from the backing store 264. The cache miss results in retrieving the reputation data from the backing store 264, which results in a slower operation, but the reputation data may be copied into the cache 260, 262, whereby a future retrieval of that data results in a cache hit. During a cache miss, an existing entry may need to be removed from the cache 260, 262 in order to make room for the reputation data newly retrieved from the backing store 264. A control such as Time to live (TTL) may be applied to expire the reputation data accordingly.

One way to implement the cache 260, 262 is an in-memory database (IMDB), or also known as main memory database (MMDB), which is configured to store the reputation data in a main memory of the computer instead of a disk drive, which results in faster access of the reputation data. The main memory is usually a volatile memory type, such as a random-access memory (RAM), but also non-volatile types of the main memory, such as a non-volatile random-access memory (NVRAM) or a non-volatile dual in-line memory module (NVDIMM) may be used.

The cache 262 may be maintained 110 in a customer-premises equipment transferring network traffic 270 between the connected device 200 and an accessed website 240. In another example, the cache 260 may be maintained in the connected device 200 itself. As shown in FIG. 2, one Customer-Premises Equipment (CPE) 230 may serve a plurality of connected devices 200, 204. As the CPE 230 is located at home or office of the user 210 of the connected device 200, the cache 262 of the CPE 230 may maintain a combination cache 262 of the plurality of connected devices 200, 204. If the connected device 200, 204 also maintains a local cache 260, the cache 262 of the CPE 230 may be copied to the local cache 260 (periodically, by a system request, or by another predetermined condition realizing). Consequently, the operations of determining 102 the one or more features of the connected device, defining 104 the set of websites potentially accessed by the connected device based on the one or more features, determining 106 the reputation data for the set of websites, and storing 108 the reputation data for the set of websites into the cache 260 maintained 110 in the CPE 230 transferring the network traffic 270 may be repeated 111 for the plurality of connected devices 200, 204.

After the cache 260, 262 is ready to use, the second part may commence, wherein the cache 260, 262 is used for performing cybersecurity operations for the connected device 200.

Network traffic 270 between the connected device 200 and an accessed website 240 is intercepted 112.

As shown in FIG. 2, the connected device 200 is configured to execute a website access application 202, such as web user interface application (a web browser, for example), or a stand-alone application (a mobile app, for example), and as a result, network traffic 270 between the connected device 200 and the accessed website 240 is caused. The website access application 202 may automatically cause the data communication 220, or, alternatively, as a result of an action by the user 210 through user interface controls of the website access application 202.

As used herein, the term "intercepting" refers to user-approved lawful interception or monitoring of the network traffic 270, with a purpose and goal of increasing cybersecurity related to the connected device 200 and its operating environment. The intercepting may be implemented so that network traffic 270 is passively monitored, i.e., the network traffic 270 is not affected by the intercepting. Alternatively, if needed, the intercepting may include a seizing of the network traffic 270, i.e., the network traffic 270 is actively influenced so that a connection and/or requests and/or responses are blocked until it may be decided whether a cybersecurity action is required.

Figure 4:
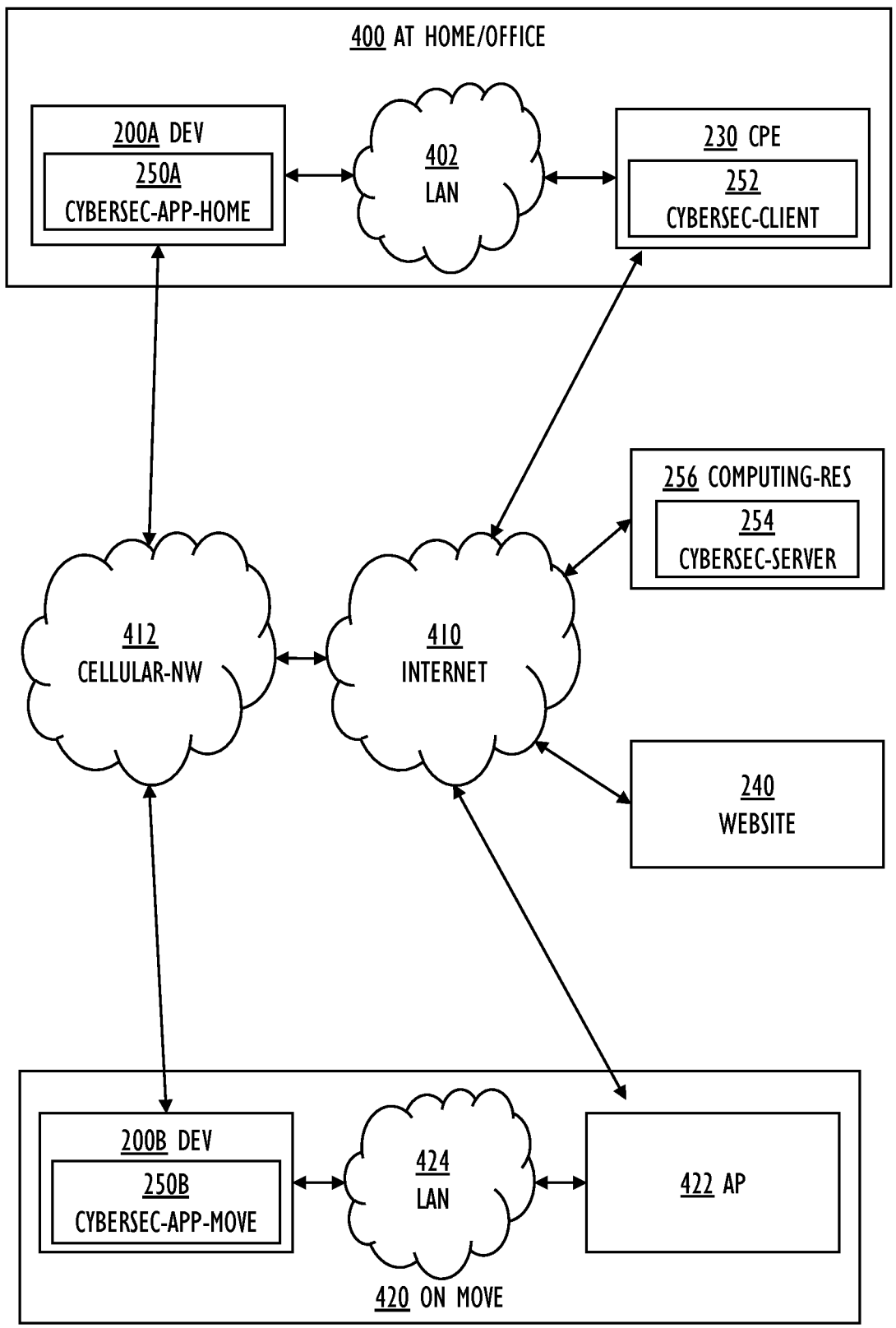
FIG. 4 is a block diagram illustrating an example operation environment.

Intercepting 112 the network traffic 270 may be implemented so that data communication 220 of the connected device 200 over a communication network is intercepted 150, and the network traffic 270 is detected 154 in the data communication 220. The intercepted 150 communication network may comprise a local area network (LAN) 402 implemented by the CPE 230 as shown in FIG. 4, and consequently, data communication 220 of the connected device 200 over the LAN implemented by the CPE 230 may be intercepted 152 for implementing the intercepting 112. Detecting 154 the network traffic in the communication 220 may be implemented so that a connection establishment between the connected device 200 and the accessed website 240 is detected 156 as the network traffic 270. Additionally, or alternatively, detecting 154 the network traffic in the communication 220 may be implemented so that one or more of a hypertext transfer protocol (HTTP) request message, an HTTP response message, an HTTP secure (HTTPS) request message, and an HTTPS response message is detected 158 as the network traffic 270.

As used herein, the term "data communication" 220 refers to the transmission and reception of (digital) data by the connected device 200. The data communication 220 is transferred over one or more communication channels (implemented by copper wires, optical fibers, and wireless communication using radio spectrum, for example) between the connected device 200 and another network node. A communication protocol may be used to transport payload data in packets. In a connection-oriented data communication 220, a connection needs to be established for transferring the payload data. In a connectionless data communication 220, the payload data is transferred over different paths with an independent routing.

Reputation data for the accessed website 240 is retrieved 114 from the cache 260, 262 based on the network traffic. This (cache hit) may be implemented so that an address of the accessed website 240 is detected 160 from the network traffic 270, and the reputation data is retrieved 162 for the accessed website 240 from the cache 260, 262 based on the address.

As explained earlier, the cache 260, 262 stores the reputation data for the set of websites, and each entry of the cache 260, 262 has the address as the tag (=identity) of the specific website. The address may be an internet protocol (IP) address, a fully qualified domain name (FQDN), a universal resource locator (URL), or a smart contract address, for example.

FQDN may be defined into a domain name system (DNS). Domain names in DNS are read from right to left:
- the root zone is represented by a full stop (period), which is usually not visible in the web browser address line;
- under the root zone is the top level domain (TLD); and
- under these are recursive subdomains (sometimes called a second level subdomain, a third level subdomain, etc.).

For example, the address of the accessed website 240 may include the following FQDN: website777888.com.

The FQDN may be written by a user 210 on an address line in the browser 202 as a part of the uniform resource locator (URL) of the website. The URL may look like this, for example:
  https://somehost.website777888.com/main A cybersecurity reputation of the accessed target website 240 may be tied to the FQDN of the target website. For example, the reputation may be maintained for the FQDN "somehost.website777888.com." including the hostname. Or, in a more general way, the cybersecurity reputation may be maintained for the FQDN "website777888.com.", specifying the domain, whereby it defines the reputations for the domain and all its subdomains.

The IP address identifies (a network interface of) the host, and a location of the host on the Internet, whereby each IP packet containing an IP address of a source host and an IP address of a destination host, may be routed by a network path from the source host (or the connected device 200) to the destination host (or the accessed target website 240). In this way, the IP address identifies the target website 240 (acting as the host).

In contrast to the FQDN being a text string, the IP address is a numerical label, defined as a 32-bit number (IPv4) or a 128-bit number (IPv6). A human-readable notation of the IPv4 address expresses the address as four consecutive decimal numbers (each representing 8 bits) separated by commas, the IPV4 address therefore ranging from 0.0.0.0 to 255.255.255.255. IPv6 has in the human-readable notation eight consecutive hexadecimal numbers (each hexadecimal number having four digits and representing 16 bits) separated by colons.

The IP address may be a static IP address, meaning that the address does not change, or a dynamic IP address, which is assigned to the host by the network when it connects, meaning that the address changes over time. The dynamic IP address may be assigned (and reassigned) by a dynamic host configuration protocol (DHCP) server, usually for a DHCP lease time (such as 24 hours, a fortnight, etc.). Finally, a cybersecurity operation related to the connected device 200 is performed 116 based on the reputation data for the accessed website 240. The network traffic 270 between the connected device 200 and the accessed website 240 may be blocked 118.

Figure 3:
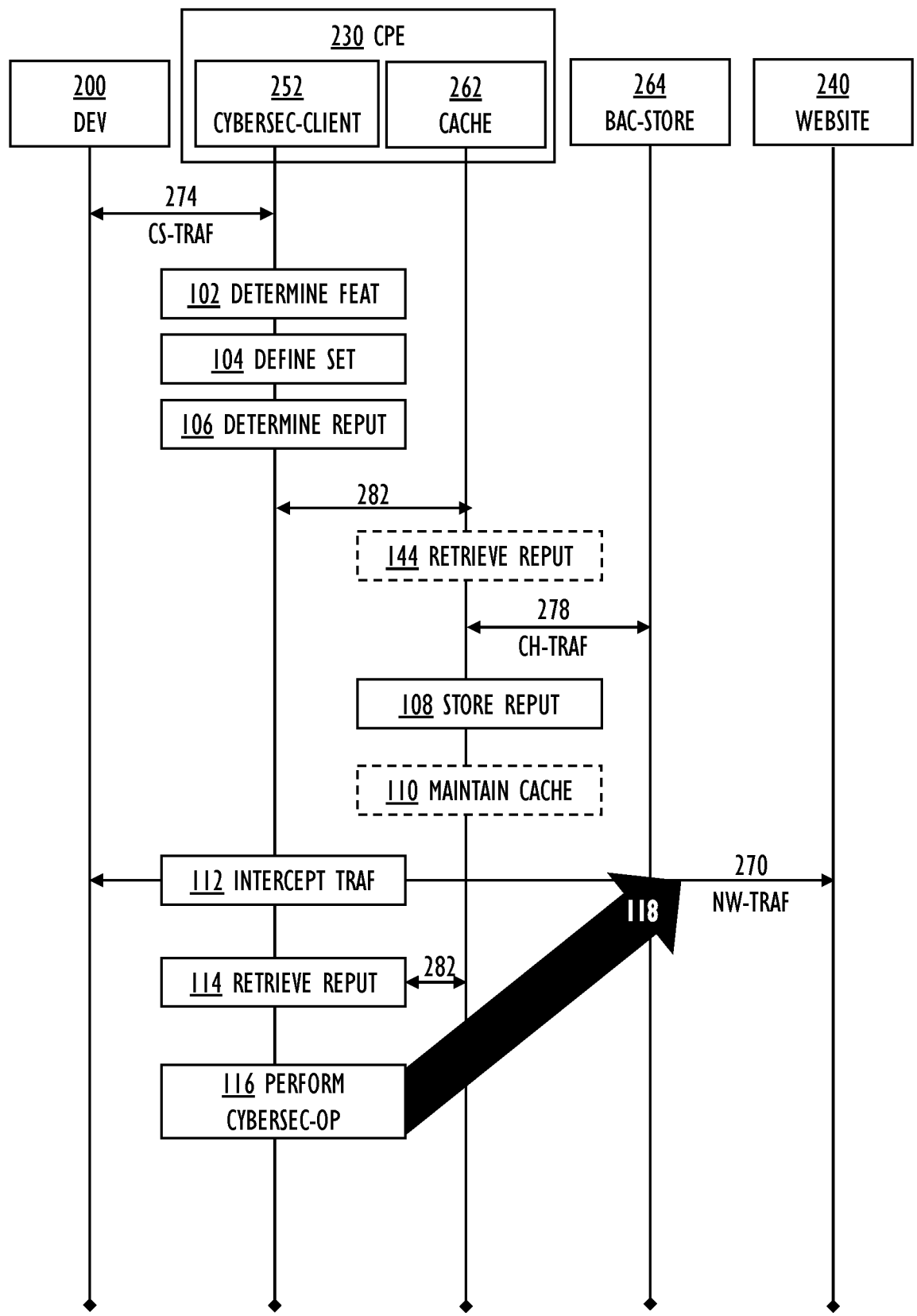
FIG. 3 is a sequence chart illustrating communication between various actors of the method.

FIG. 3 illustrates communication between various actors of the method.

The connected device 200 may create a connection 274 using a packet protocol between a cybersecurity application 250 on the connected device 200 and a cybersecurity client 252 on a customer-premises equipment 230. But this is not necessarily needed, as the connected device 200 may not be provided with the cybersecurity application 250. Note a possible connection 272 between the cybersecurity application 250 and the cybersecurity server application 254, and another possible connection 276 between the cybersecurity client application 252 and the cybersecurity server application 254.

With or without the connection 274, the cybersecurity client 252 on the customer-premises equipment 230 performs the operations 102, 104, 106, i.e., determines 102 the one or more features of the connected device 200, defines 104 the set of websites potentially accessed by the connected device 200 based on the one or more features, and determines 106 the reputation data for the set of websites. The cybersecurity client 252, in cooperation with the cache 262, i.e., manipulating the cache 262 directly 282, or by giving 282 commands to a separate cache maintenance software, causes that the reputation data for the set of websites is stored 108 into the cache 262 of the customer-premises equipment 230, with the optional operations 144 and 110.

The connected device 200 creates a connection 270 using a packet protocol for the web access application 202, such as a browser or a dedicated mobile app, to the accessed website 240.

The packet protocols include, but are not limited to, Transmission Control Protocol/Internet Protocol (TCP/IP), User Datagram Protocol/Internet Protocol (UDP/IP), and QUIC, which establishes a multiplexed transport on top of the UDP.

Various Hypertext Transfer Protocol/Hypertext Transfer Protocol Secure (HTTP/HTTPS) requests may then be transferred in the connection 270, (using TCP streams or UDP datagrams, for example). Note that the term "connection" is used here for both TCP/IP and UDP/IP, although strictly speaking, the connection only exists in the connection-oriented TCP/IP, whereas in the connectionless UDP/IP messages are used for the "connection".

In the Internet protocol suite, the connection 270 is operated in a link layer, an internet layer, and a transport layer, and the requests transmitted in the connection 270 are operated in an application layer.

Then the network traffic 270 between the connected device 200 and the accessed website 240 is intercepted 112 by the cybersecurity client 252.

The cybersecurity client 252 retrieves 114 the reputation data for the accessed website 240 from the cache 262 based on the network traffic 270.

Finally, the cybersecurity client 252 performs 116 a cybersecurity operation (such as the blocking 118) related to the connected device 200 based on the reputation data for the accessed website 240.

FIG. 4 illustrates an example operation environment.

Two basic use cases are described: at home or office 400, and on the move 420.

The Internet 410 uses the Internet protocol suite including TCP/IP and UDP/IP to globally connect computer networks so that communication is enabled between connected devices 200A, 200B and various services provided typically by websites 240. The Internet 410 comprises public networks, private networks, academic networks, business networks, government networks, etc. interlinked with various networking technologies. The various services provide access to vast World Wide Web (WWW) resources, wherein webpages may be written with Hypertext Markup Language (HTML) or Extensible Markup Language (XML) and accessed by a browser or another application (such as a mobile app) running in the connected device 200A, 200B.

From the cybersecurity point of view, the Internet services may be divided between legitimate services and fraud services. Legitimate services operate according to moral and ethical standards enforced by law, police, or social pressure. Fraud services do not follow moral and ethical standards, and often perform criminal acts to disclose, steal or damage electronic data, software or hardware, or disrupt or misdirect services provided by the electronic data, software, and hardware. Fraud services may be fraudulent to the core, i.e., their only reason for existence is to perform malicious acts, but they may also be legitimate services as such, but being infected with malicious software so as to enable criminal acts. The criminal acts in general include, but are not limited to using a backdoor to bypass security mechanisms, make a denial-of-service attack (DoS), also as a distributed denial-of-service (DDoS), installing software worms or keylogger, eavesdropping a communication, phishing, spoofing, tampering, installing malware, etc. Note that different service providers, such as network operators, cloud service operators, and cybersecurity operators, just to name a few, may operate and/or manage the various network nodes shown in FIG. 2.

Device identification, which may be defined as a capability to detect various connected devices 200, such as the user devices and IoT devices with a home/office LAN 402, also increases the cybersecurity. Traditionally, a Medium/Media Access Control (MAC) protocol address is assigned by a device manufacturer and used in the data communication 220 (such as with wireless radio signals) within the LAN for the device identification. However, MAC randomization, which anonymizes and randomizes the MAC address to increase privacy, hinders the device identification based on the MAC address. Machine learning algorithms may use a number of other data items (such as device-specific unique radio interface characteristics, other current and historic unique identifiers related to the connected device 200A and its communication) to enable the device identification despite of the MAC randomization.

Numerous cellular networks (or mobile networks) 412 provide access to the Internet 410 for the connected device 200A, 200B (both at home or office 400 and on the move 420) by providing a wireless link in a radio cell implemented by a base station (or a base transceiver station, an eNodeB (eNB), a gNodeB (gNB), or an access point, for example) implemented using a standard technology, including, but not being limited to a cellular radio network (GSM, GPRS, EGPRS, WCDMA, UMTS, 3GPP, IMT, LTE, LTE-A, 3G, 4G, 5G, 5G NR (5G New Radio), 6G, etc.), a wireless local area network (such as Wireless Local Area Network (WLAN), Wi-Fi®, etc.), or a short-range radio network (such as Bluetooth or Bluetooth Low Energy (BLE), etc.). The use of the cellular radio network may necessitate use of a subscriber identity module (SIM), either as a physical chip, or as an embedded-SIM (eSIM), for example.

The CPE (230 is located at home or office 400 of the user 210 of the connected device 200A. The CPE 230 is stationary equipment connected to a telecommunication circuit of a carrier (such as a broadband service provider) at a demarcation point. The demarcation point may be defined as a point at which the public Internet 410 ends and connects with a Local Area Network (LAN) 402 at the home or office of the user of the connected device 200A. In this way, the CPE 230 acts as a network bridge.

The CPE 230 may include one or more functionalities of a router, a network switch, a residential gateway, a fixed mobile convergence product, a home networking adapter, an Internet access gateway, or another access product distributing the communication services locally in a residence or in an enterprise via a (typically wireless) LAN and thus enabling the user of the connected device 200A to access communication services of the broadband service provider, and the Internet 410. Note that the CPE 230 may also be implemented with wireless technology, such as a 5G CPE 230 configured to exchange a 5G cellular radio network signal with a base station operated by the broadband service provider, and generate a Wi-Fi® (or WLAN) or wired signal to implement the LAN 402 to provide access for the connected device 200A. Furthermore, the 5G CPE 230 performs the conversion between the 5G cellular radio network signal and the Wi-Fi® or wired signal.

On the move 420, the user of the connected device 200B may access the Internet 410 via the cellular networks 412, or via a local access point 422 implementing a local area network 424. The access point 422 may be provided with similar technology as used by the CPE 230. The access point 422 may be located at a bus station, at a train station, at an airport, at a hotel room, at a hotel lobby, at a conference or fair center, at a shopping mall, at a cafe, at a museum, at a rented apartment, or at another public or private location.

Figure 5A:
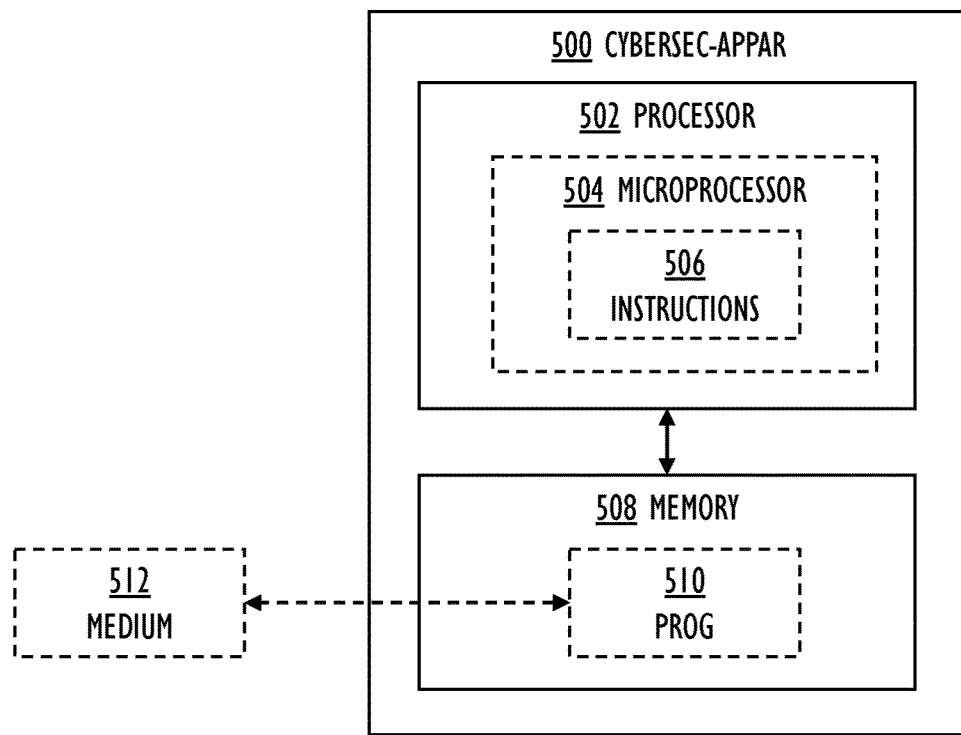
FIG. 5A and FIG. 5B are block diagrams illustrating examples of a cybersecurity apparatus.
Figure 5B:
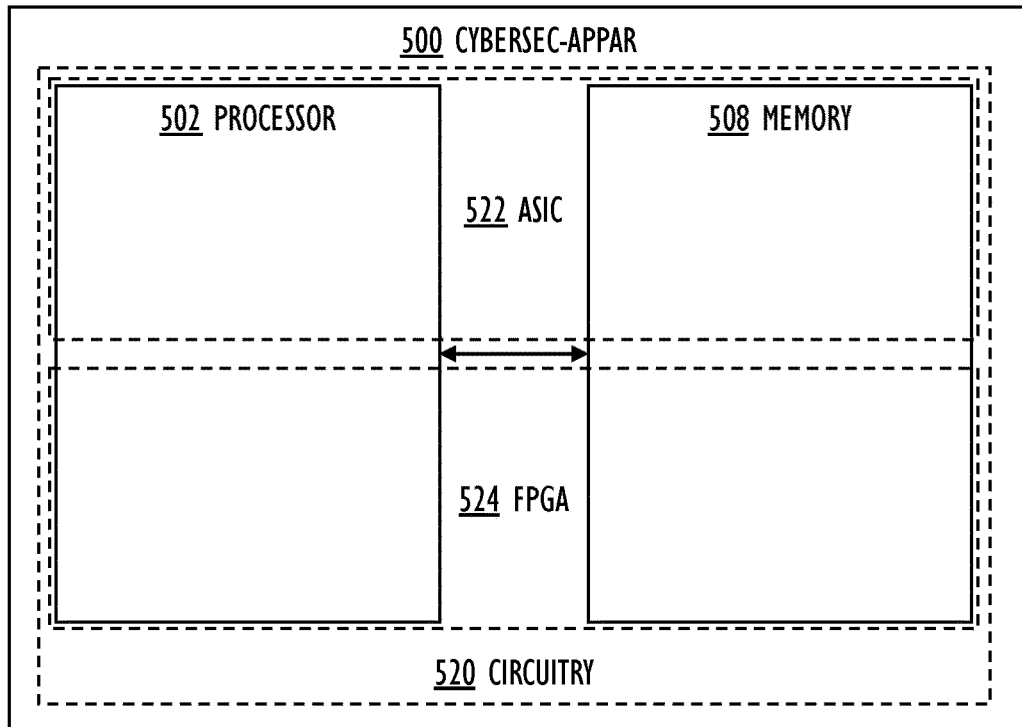

FIG. 5A and FIG. 5B illustrate examples of a cybersecurity apparatus 500 performing the operations of FIG. 1A and FIG. 1B.

The method described with reference to FIG. 1A and FIG. 1B may be implemented by the cybersecurity apparatus 500. The apparatus 500 may execute the operations defined in the method. The apparatus 500 may implement an algorithm, which includes at least the operations of the method, but may optionally include other operations related to the cybersecurity in general.

The apparatus 500 comprises one or more memories 508, and one or more processors 502 coupled to the one or more memories 508 configured to execute the operations described in FIG. 1A and FIG. 1B.

The term "processor" 502 refers to a device that is capable of processing data. The term "memory" 508 refers to a device that is capable of storing data run-time (=working memory) or permanently (=non-volatile memory).

As shown in FIG. 5A, the one or more processors 502 may be implemented as one or more microprocessors 504, which are configured to execute instructions 506 of a computer program 510 stored on the one or memories 508. The microprocessor 504 implements functions of a central processing unit (CPU) on an integrated circuit. The CPU is a logic machine executing the instructions 506 of the computer program 510. The CPU may comprise a set of registers, an arithmetic logic unit (ALU), and a control unit (CU). The control unit is controlled by a sequence of the instructions 506 transferred to the CPU from the (working) memory 508. The control unit may contain a number of microinstructions for basic operations. The implementation of the microinstructions may vary, depending on the CPU design. The one or more microprocessors 504 may be implemented as cores of a single processor and/or as separate processors. Note that the term "microprocessor" is considered as a general term including, but not being limited to a digital signal processor (DSP), a digital signal controller, a graphics processing unit, a system on a chip, a microcontroller, a special-purpose computer chip, and other computing architectures employing at least partly microprocessor technology. The memory 508 comprising the working memory and the non-volatile memory may be implemented by a random-access memory (RAM), dynamic RAM (DRAM), static RAM (SRAM), a flash memory, a solid-state drive (SSD), PROM (programmable read-only memory), a suitable semiconductor, or any other means of implementing an electrical computer memory.

The computer program ("software") 510 may be written ("coded") by a suitable programming language, and the resulting executable code may be stored in the memory 508 and executed by the one or more microprocessors 504.

The computer program 510 implements the method/algorithm. The computer program 510 may be coded using a programming language, which may be a high-level programming language, such as Go, Java, Python, C, or C++, or with a low-level programming language, such as an assembler or a machine language. The computer program 510 may be in source code form, object code form, executable file, or in some intermediate form, but for use in the one or more microprocessors 504 it is in an executable form as an application. There are many ways to structure the computer program 510: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program 510 for performing a wide variety of standard operations. In addition, an operating system (such as a general-purpose operating system) may provide the computer program 510 with system services.

As shown in FIG. 5A, a computer-readable medium 512 may store the computer program 510, which, when executed by the apparatus 500 (the computer program 510 may first be loaded into the one or more microprocessors 504 as the instructions 506 and then executed by one or more microprocessors 504), causes the apparatus 500 (or the one or more microprocessors 504) to carry out the method/algorithm. The computer-readable medium 512 may be implemented as a non-transitory computer-readable storage medium, a computer-readable storage medium, a computer memory, a computer-readable data carrier (such as an electrical carrier signal), a data carrier signal (such as a wired or wireless telecommunications signal), or another software distribution medium capable of carrying the computer program 510 to the one or memories 508 of the apparatus 500. In some jurisdictions, depending on the legislation and the patent practice, the computer-readable medium 512 may not be the wired or wireless telecommunications signal.

As shown in FIG. 5B, the one or more processors 502 and the one or more memories 508 may be implemented by a circuitry 520. A non-exhaustive list of implementation techniques for the circuitry 520 includes, but is not limited to application-specific integrated circuits (ASIC) 522, field-programmable gate arrays (FPGA) 524, application-specific standard products (ASSP), standard integrated circuits, logic components, and other electronics structures employing custom-made or standard electronic circuits.

Note that in modern computing environments a hybrid implementation employing both the microprocessor technology of FIG. 5A and the custom or standard circuitry of FIG. 5B is feasible.

Functionality of the apparatus 500, including the capability to carry out the method/algorithm, may be implemented in a centralized fashion by a stand-alone single physical unit, or alternatively in a distributed fashion using more than one communicatively coupled physical units. The physical unit may be a computer, or another type of a general-purpose off-the-shelf computing device, as opposed to a purpose-build proprietary equipment, whereby research and development costs will be lower as only the special-purpose software (and necessarily not the hardware) needs to be designed, implemented, tested, and produced. However, if highly optimized performance is required, the physical unit may be implemented with proprietary or standard circuitry as described earlier.

FIG. 6 illustrates an example of a connected device 200 as the apparatus 500. As shown in FIG. 6, the connected device 200 comprises the one or more memories 508, and the one or more processors 502 coupled to the one or more memories 508 configured to carry out a part of the method/algorithm. In addition, the connected device 200 comprises a user interface 600 (such as a touch screen or one or more LEDs), and one or more wireless transceivers (such as a WLAN transceiver, a cellular radio network transceiver, and a short-range radio transceiver) 602, and also one or more sensors 604. As shown in FIG. 2 and FIG. 4, the connected device 200, 200A, 200B, may be running a cybersecurity application 250, 250A, 250B.

FIG. 7 illustrates an example of a computing resource 256 such as a server apparatus as the apparatus 500. The server apparatus 256 may be a networked computer server, which interoperates with the connected device 200A, 200B and/or with the CPE 230 according to a client-server architecture, a cloud computing architecture, a peer-to-peer system, or another applicable distributed computing architecture. As shown in FIG. 7, the server apparatus 256 comprises the one or more memories 508, and the one or more processors 502 coupled to the one or more memories 508 configured to carry out a part of the method/algorithm. In addition, the server apparatus 256 comprises a network interface (such as an Ethernet network interface card) 702 configured to couple the server apparatus 256 to the Internet 410. As shown in FIG. 4, the computing resource 256 may be running a cybersecurity application 254, such as a cybersecurity server application 254.

FIG. 8A and FIG. 8B illustrate examples of a customer-premises equipment 230 as the apparatus 500.

In FIG. 8A, the CPE 230 is an integrated apparatus comprising the one or more memories 508, and the one or more processors 502 coupled to the one or more memories 508 configured to carry out a part of the method/algorithm or the complete method/algorithm. Additionally, the CPE 230 comprises a wireless radio transceiver 800 configured to create the WLAN 402 for enabling access by the connected device 200A. The CPE 230 also comprises a network interface 802 to act as a modem configured to connect to the telecommunication circuit of the carrier at the demarcation point. The network interface 802 may operate as a Digital Subscriber Line (DSL) modem 804 using different variants such as Very high bitrate DSL (VDSL), Symmetric DSL (SDSL), or Asymmetric DSL (ADSL). As shown in FIG. 4, the CPE 230 may be running a cybersecurity application 252, such as a cybersecurity client application 252.

In FIG. 8B, the CPE 230 is a two-part apparatus. A WLAN router part 810 comprises the one or more memories 508, the one or more processors 502 coupled to the one or more memories 508 configured to carry out the method/algorithm, and the wireless transceiver 800 to create the WLAN 402 for enabling access by the connected device 200A. A modem part 820 comprises one or more processors 822 coupled to one or more memories 824 configured to carry out modem operations, and the network interface 802 to act as the modem configured to connect to the telecommunication circuit of the carrier at the demarcation point. The WLAN router part 810 may be purchased by the user of the connected device 200A to gain access to the method/algorithm, whereas the modem part 820 may be provided by carrier providing the telecommunication circuit access. As shown in FIG. 8B, the WLAN router part 810 and the modem part 820 may be communicatively coupled by an interface 826 (such as a wired Ethernet interface).

As illustrated in FIG. 4, the functionality of the apparatus 500, including the capability to carry out the method/algorithm, may be implemented in a centralized fashion by a stand-alone single physical unit, or alternatively in a distributed fashion using more than one communicatively coupled physical units.

These physical units comprise the connected device 200, the connected device 200A at the home or office 400 running the cybersecurity application 250A with a home or office functionality, the connected device 200B on the move 420 running a cybersecurity application 250B with an on the move functionality, the CPE 230 running a cybersecurity client application 252, and the computing resource 256 running a cybersecurity server application 254. The method/algorithm operations may be implemented by one or more of these devices 200A/200B/230/256 executing the cybersecurity applications 250A/250B/252/254.

As can be understood by the person skilled in the art, the method/algorithm operations may be distributed among the distributed software comprising the cybersecurity application 250A, 250B, the cybersecurity client application 252, and the cybersecurity server application 254 in numerous different configurations. In a first example, the cybersecurity application with the home functionality 250A communicates with the cybersecurity client application 252 and/or the cybersecurity server application 254 to implement the method/algorithm functionality. In a second example, the cybersecurity client application 252 communicates with the cybersecurity server application 254 to implement the method/algorithm functionality. In a third example, the cybersecurity application with the on the move functionality 250B communicates with the cybersecurity server application 254 to implement the method/algorithm functionality.

Thus, the cybersecurity application 250, 250A, 250B may comprise a stand-alone functionality to carry out the method/algorithm, or a part of the functionality, augmented by functionality of the cybersecurity client application 252 and/or by a functionality of the cybersecurity server application 254. Alternatively, the cybersecurity client application 252 may comprise a stand-alone fashion to carry out the method/algorithm, or a part of the functionality augmented by the functionality of the cybersecurity server application 254. As an additional alternative, the cybersecurity server application 254 may comprise a stand-alone fashion to carry out the method/algorithm. The cybersecurity application 250, 250A, 250B, and/or the cybersecurity client application 252 may operate as a frontend with a relatively limited resources as regards to the processor and memory, whereas the cybersecurity server application 254 may operate as a backend with a relatively unlimited resources as regards to the processor and memory, and the capability to serve a very large number of the connected devices 200A, 200B simultaneously.

Even though the invention has been described with reference to one or more examples according to the accompanying drawings, it is clear that the invention is not restricted thereto but can be modified in several ways within the scope of the appended claims. All words and expressions should be interpreted broadly, and they are intended to illustrate, not to restrict, the examples. As technology advances, the inventive concept defined by the claims can be implemented in various ways.

What is claimed is:

1. A computer-implemented method comprising:
   determining one or more features of a connected device;
   subsequent to determining the one or more features, generating a set of websites that may subsequently be accessed by the connected device based on the one or more features;
   subsequent to generating the set of websites, obtaining reputation data for the set of websites from a remote source;
   storing, by a customer premises equipment (CPE), the reputation data for the set of websites into a cache;
   subsequent to storing the reputation data, intercepting, by the CPE, network traffic between the connected device and an accessed website;
   retrieving, by the CPE, reputation data for the accessed website from the cache based on the network traffic; and
   performing, by the CPE, a cybersecurity operation related to the connected device based on the reputation data for the accessed website;
   wherein the one or more features of the connected device comprise at least one of a type of the connected device, a model of the connected device, an application installed on the connected device, an application executing on the connected device, or a user profile associated with the connected device, wherein the user profile comprises information that identifies one or more of a demographic feature of the user or an interest group of the user.

2. The method of claim 1, wherein determining the one or more features of the connected device further comprises:
   determining a household profile of a user of the connected device as the one or more features of the connected device.

3. The method of claim 1, further comprising:
maintaining the cache in a customer-premises equipment (CPE) transferring the network traffic.

4. The method of claim 3, further comprising:
repeating, for a plurality of connected devices, determining the one or more features of the connected device, generating the set of websites that may subsequently be accessed by the connected device based on the one or more features, obtaining the reputation data for the set of websites from the remote source, and storing, by the CPE, the reputation data for the set of websites into the cache maintained in the CPE transferring the network traffic.

5. The method of claim 1, wherein intercepting the network traffic between the connected device and the accessed website further comprises:
intercepting data communication of the connected device over a communication network; and
detecting, in the data communication, the network traffic.

6. The method of claim 5, wherein intercepting the data communication of the connected device over the communication network further comprises:
intercepting the data communication of the connected device over the communication network comprising a local area network (LAN) implemented by a customer-premises equipment (CPE).

7. The method of claim 5, wherein detecting, in the data communication, the network traffic further comprises:
detecting, as the network traffic, a connection establishment between the connected device and the accessed website.

8. The method of claim 5, wherein detecting, in the data communication, the network traffic further comprises:
detecting, as the network traffic, one or more of a hypertext transfer protocol (HTTP) request message, an HTTP response message, an HTTP secure (HTTPS) request message, and an HTTPS response message.

9. The method of claim 1, wherein obtaining the reputation data for the set of websites from the remote source further comprises:
retrieving the reputation data for websites in the set of websites from a website reputation database.

10. The method of claim 9, wherein obtaining the reputation data for the set of websites from the remote source further comprises:
updating continuously, by a supervised machine learning algorithm using a training set comprising malicious websites and trustworthy websites, the website reputation database.

11. The method of claim 1, wherein retrieving the reputation data for the accessed website from the cache based on the network traffic further comprises:
detecting an address of the accessed website from the network traffic; and
retrieving the reputation data for the accessed website from the cache based on the address, wherein the address comprises one or more of an internet protocol (IP) address, a fully qualified domain name (FQDN), a universal resource locator (URL), and a smart contract address.

12. The method of claim 1, wherein performing the cybersecurity operation related to the connected device based on the reputation data further comprises:
blocking the network traffic between the connected device and the accessed website.

13. An apparatus comprising:
one or more memory devices; and
one or more processor devices coupled to the one or more memories configured to:
determine one or more features of a connected device;
subsequent to determining the one or more features, generate a set of websites that may subsequently be accessed by the connected device based on the one or more features;
subsequent to generating the set of websites, obtain reputation data for the set of websites from a remote source;
store the reputation data for the set of websites into a cache;
subsequent to storing the reputation data, intercept network traffic between the connected device and an accessed website;
retrieve reputation data for the accessed website from the cache based on the network traffic; and
perform a cybersecurity operation related to the connected device based on the reputation data for the accessed website;
wherein the one or more features of the connected device comprise at least one of a type of the connected device, a model of the connected device, an application installed on the connected device, an application executing on the connected device, or a user profile associated with the connected device, wherein the user profile comprises information that identifies one or more of a demographic feature of the user or an interest group of the user.

14. The apparatus of claim 13, wherein the one or more processor devices coupled to the one or more memory devices are further configured to:
maintain the cache in a customer-premises equipment (CPE) transferring the network traffic; and
repeat, for a plurality of connected devices, the operations of determining the one or more features of the connected device, generating the set of websites that may subsequently be accessed by the connected device based on the one or more features, obtaining the reputation data for the set of websites from the remote source, and storing the reputation data for the set of websites into the cache maintained in the CPE transferring the network traffic.

15. A non-transitory computer-readable medium comprising a computer program with instructions which, when executed by an apparatus, cause the apparatus to:
determine one or more features of a connected device;
subsequent to determining the one or more features, generate a set of websites that may subsequently be accessed by the connected device based on the one or more features;
subsequent to generating the set of websites, obtain reputation data for the set of websites from a remote source;
store the reputation data for the set of websites into a cache;
subsequent to storing the reputation data, intercept network traffic between the connected device and an accessed website;
retrieve reputation data for the accessed website from the cache based on the network traffic; and
perform a cybersecurity operation related to the connected device based on the reputation data for the accessed website;
wherein the one or more features of the connected device comprise at least one of a type of the connected device, a model of the connected device, an application installed on the connected device, an application executing on the connected device, or a user profile associated with the connected device, wherein the user profile comprises information that identifies one or more of a demographic feature of the user or an interest group of the user.

\* \* \* \* \*